United States Patent [19]

Zaenglein et al.

[11] Patent Number: 4,971,181

[45] Date of Patent: Nov. 20, 1990

[54] PRELOADED PISTON VALVING FOR HYDRAULIC DAMPERS AND METHOD OF ASSEMBLING THE SAME

[75] Inventors: Daniel P. Zaenglein, Centerville; Joel R. Wells, Huber Heights; Thomas N. Tiller, Germantown, all of Ohio

[73] Assignee: General Motors Corporation, Detroit, Mich.

[21] Appl. No.: 343,720

[22] Filed: Apr. 27, 1989

Related U.S. Application Data

[63] Continuation of Ser. No. 182,642, Apr. 11, 1988, abandoned.

[51] Int. Cl.$^5$ .................. F16F 9/34; B23P 11/00; F16K 15/02
[52] U.S. Cl. ................ 188/322.15; 29/436; 29/446; 137/543.17
[58] Field of Search ............... 188/282, 284, 311, 315, 188/317, 322.15, 322.22, 319; 29/436, 446; 137/543.17, 543.19; 251/333, 337

[56] References Cited

U.S. PATENT DOCUMENTS

| | | | |
|---|---|---|---|
| 3,187,847 | 6/1965 | Karlgaard | 188/317 |
| 3,621,949 | 11/1971 | Watson | 188/284 |
| 3,724,615 | 4/1973 | Stormer | 188/322.15 |
| 3,999,274 | 12/1976 | Butler | 29/243.54 |
| 4,356,898 | 11/1982 | Guzder et al. | 188/282 X |
| 4,606,440 | 8/1986 | Buchanan, Jr. et al. | 188/319 |
| 4,747,475 | 5/1988 | Hagwood et al. | 188/322.15 |

FOREIGN PATENT DOCUMENTS 900061 12/1953 Fed. Rep. of Germany ............... 188/322.15

Primary Examiner—Robert J. Oberleitner
Attorney, Agent, or Firm—A. Michael Tucker

[57] ABSTRACT

A load cell exerts a force on a loose spring cage of a rebound spring to displace the cage and hold it in position on the piston of a hydraulic damper unit until it is welded in position. This preloads the rebound spring to close tolerance so that rebound valve operation is constant regardless of variation in spring sizes, rates and stack up heights of valve components.

9 Claims, 1 Drawing Sheet

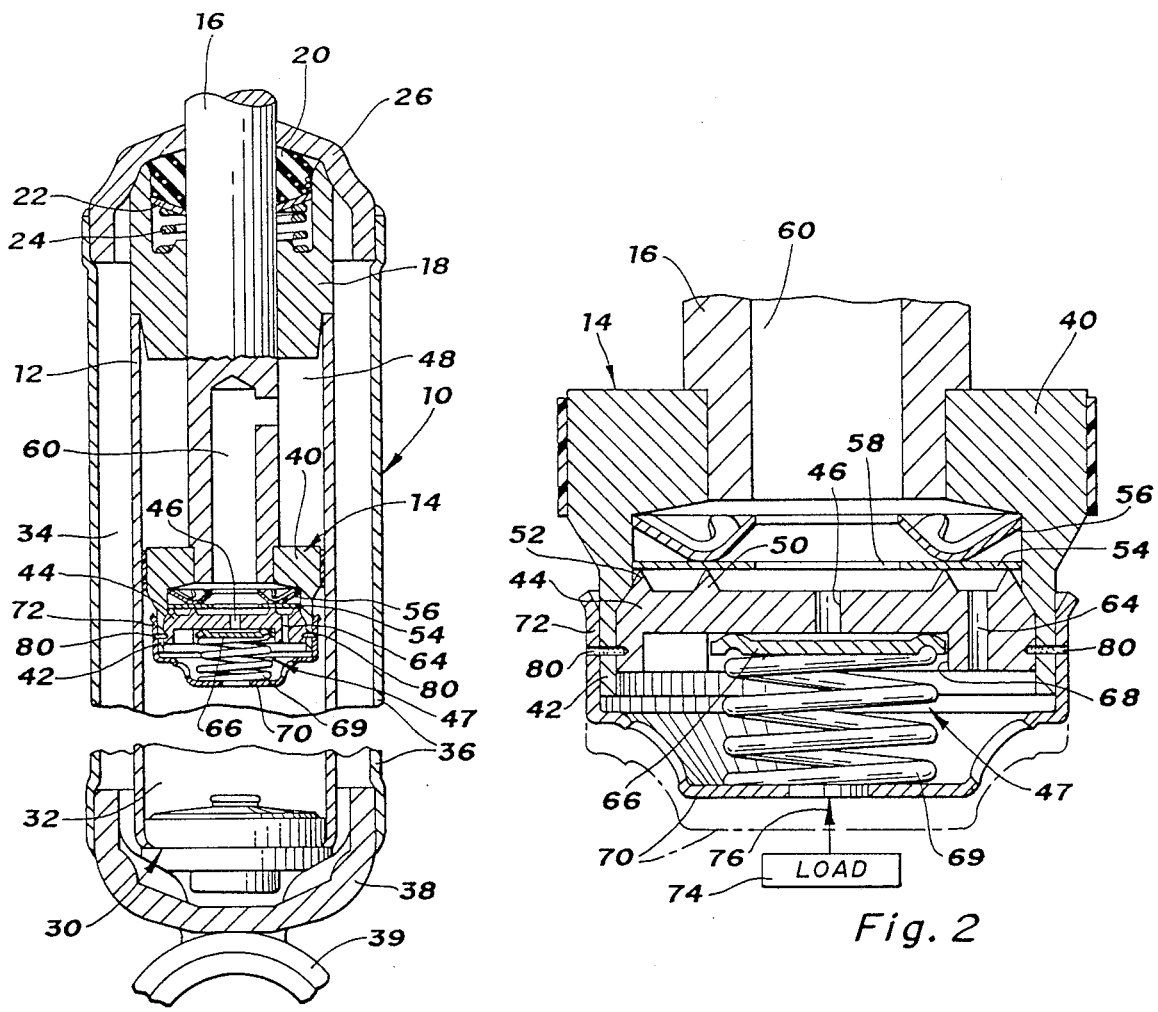
Fig. 1
Fig. 2
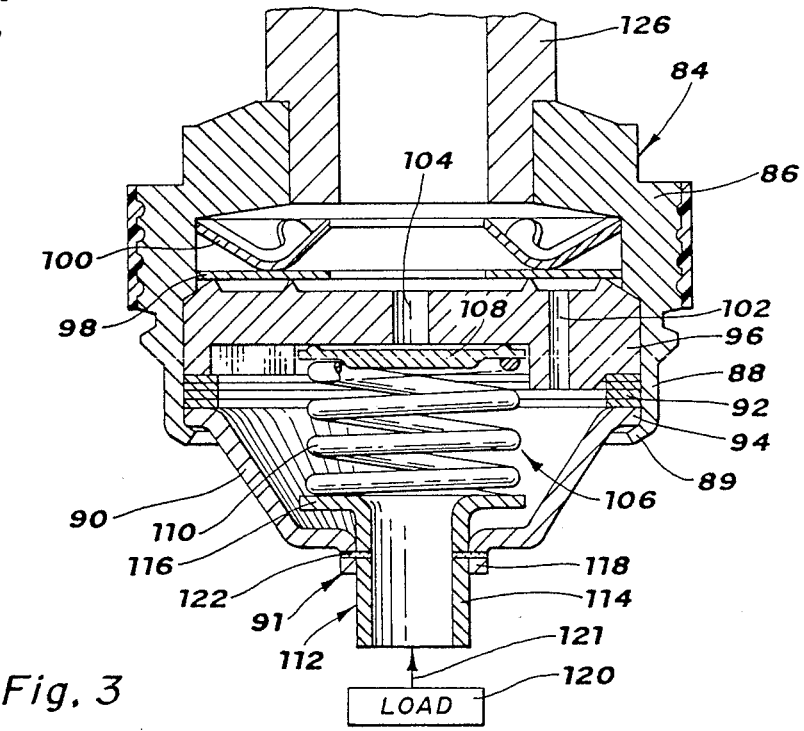
Fig. 3

PRELOADED PISTON VALVING FOR HYDRAULIC DAMPERS AND METHOD OF ASSEMBLING THE SAME

This is a continuation of application Ser. No. 182,642 filed Apr. 11, 1988, now abandon.

FIELD OF THE INVENTION

This invention relates to hydraulic dampers for controlling the action of vehicle suspension springs and more particularly to a new and improved preloaded hydraulic valve assembly for the damper piston and to a method for preloading valve control springs to compensate for part variations including valve spring sizes and rates.

DESCRIPTION OF RELATED ART

Various hydraulic shock absorbers and struts have piston assemblies with a depending spring cage crimp fastened to the body of the piston to trap the rebound spring seated therein. With this construction, the spring extends upwardly from its seat to a predetermined working height by contact with a disk like valve element that is operative to control fluid flow through a flow passage in an orifice plate of the piston assembly. While good performance can be obtained with a "fixed height" installation, part tolerances have to be close and the spring rates need to be substantially the same so that each unit of a production run operates at the same force level. An illustrative damper having a piston assembly as described above is disclosed in U.S. Pat. No. 3,621,949, issued Nov. 23, 1971 and assigned to the assignee of this invention and hereby incorporated by reference.

SUMMARY OF THE INVENTION

The present invention is of the general type disclosed in the referenced U.S. Pat. No. 3,621,949 but, instead of setting the rebound control spring to a fixed working height, advantageously utilizes the spring cage as a spring adjusting device. A given load is applied to the spring cages as piston assemblies are being produced to set the rebound springs at variable heights in accordance with variation in spring size and rate to thereby preload rebound spring to a constant spring force. This ensures the opening of the rebound valve when a predetermined load is applied to the rebound valve element for highly consistent and effective damping operation for each damper in a production run.

In the preferred embodiments of this invention the spring cage or part thereof is axially adjusted using a load cell as a given force to compress the rebound spring to a close tolerance calibration. The spring cage is then welded in position to the piston. Accordingly the valve assembly is set to a predetermined preload, regardless of piece part tolerance and varying spring rates. This ensures that each one of a number of quantity produced dampers operates at the same force level and variations in performance of such valving is minimized. In one preferred embodiment the spring cage is a two-part construction that includes a spring seat which is adjusted by the load cell to compress the spring to a predetermined preload. The seat is then laser welded to the body of the spring cage. With these constructions and method of assembly production, repeatability of damper units having the same operating characteristics is obtained.

BRIEF DESCRIPTION OF THE DRAWINGS

These and other features objects and advantages will become more apparent from the following detailed description and drawing in which:

FIG. 1 is a side view, partly in elevation and partly in cross section, of a hydraulic double acting damper according to this invention.

FIG. 2 is an enlarged view of the piston of FIG. 1.

FIG. 3 is an enlarged view of a piston illustrating another preferred embodiment of this invention.

DESCRIPTION OF THE PREFERRED EMBODIMENTS

Turning now in greater detail to the drawings FIG. 1 illustrates a direct and double acting shock absorber 10 for damping the spring action of a vehicle suspension. This shock absorber comprises a fluid-filled cylinder tube 12 in which a valved piston assembly 14 is operatively mounted for linear stroking movement for controlling the action of the suspension springs during jounce and rebound. A piston rod 16 fastened at its inner end to the piston assembly extends upwardly therefrom and through the cylinder tube 12, a piston rod guide 18, an elastomeric seal 20, seal retainer 22, a helical seal spring 24 and through a cap-like upper seal cover 26 into connection with an upper mount, not shown, for attachment to the sprung or unsprung mass of the vehicle.

The upper end of the cylinder tube is closed by the piston rod guide 18 while the lower end has a base valve assembly 30 operatively mounted therein that controls the flow of fluid between the cylinder tube chamber 32 beneath the piston assembly and a reservoir 34 formed between a reservoir tube 36 that surrounds the cylinder tube. The reservoir tube has its lower end welded to a base cup 38 and its upper end welded to the seal cover 26 to provide a fluid tight outer jacket. The base cup has a lower mount 39 for attachment to the unsprung or spring mass of the vehicle.

The piston has valving to control jounce and rebound action of the spring suspended wheel assembly so as when the vehicle travels along rough roadways to provide improved vehicle ride and control. As shown in the embodiment of FIG. 2, the piston assembly 14 has a shell like piston body 40 with a depending annular skirt 42 in which a cylindrical orifice plate 44 is secured. The orifice plate 44 has a centralized fluid flow passage 46 therein controlled by a rebound valve assembly 47 that hydraulically interconnects the variable volume chamber 48 above the piston to the variable volume chamber 32 below the piston assembly 14 as will be further explained hereinafter.

Seated on inner and outer annular valve seats 50 and 52 formed on top the orifice plate 44 and within the body of the piston is a flat intake or jounce valve element 54 that is yieldably held in position by the force exerted thereon by a conventional wave spring 56. The valve element 54 has the configuration of a thin flat washer with a center opening 58 so that there is hydraulic communication between the central opening or passage 46 in the orifice plate and the upper chamber 48 via of a rebound cut-off passage 60 bored in the piston rod. The jounce control valve element 54 when seated on the valve seat blocks the intake passages 64 formed in the orifice plate radially outward of the central passage 46. On jounce action, the shock absorber is telescoped together and fluid forced from the lower chamber lifts valve element 54 from the valve seat against the action of wave spring 56 to provide the restricted opening hydraulically connecting the contracting lower chamber to the expanding upper chamber for jounce control.

The rebound valve assembly 47 includes a disc-like blow off valve element 66 mounted in a recess 68 in the lower side of the orifice plate and a helical rebound spring 69 having an upper end turn in contact with the valve element 66 and a lower end turn seated on the bottom of a sheet metal rebound spring cage 70. This spring cage is bowl-shaped with a cylindrical rim 72 which slidably fits over the depending annular skirt 42 of the piston body. A load cell 74 applies a predetermined axial preload 76 to the lower side of the cage while the piston body is held stationary to displace the cage against the force of the rebound spring and preloads the spring so that it exerts a predetermined spring force against the blow off valve element 66. This spring force is determined by given load 76 and is the same regardless of piece part tolerances, variations in spring rate or stackup height of spacing washers and the orifice plate. After the spring cage is positioned by the load cell to preload the rebound spring spring, the cage is welded at predetermined arcuately spaced stations 80 to the skirt of the piston body 40. This load is then removed and the piston assembly is joined to the rod.

As shown, the welds 80 may extend into the orifice plate to secure the orifice plate to the skirt 42 to provide a strengthened piston assembly with a close tolerance rebound calibration which is readily repeatable enhancing the quality of quantity production. With the spring cage being adjustable by a known load to set the force of the rebound control spring, overall piston and rod assembly length may vary according to the amount of cage displacement but such variation will usually be so small that operational and sizing standards are met. If very precise assembly lengths are required, spin forming or friction welding of the piston assembly to the piston rod can be used to control overall assembly length. In the FIG. 2 embodiment, crimping of the rebound spring cage to the body of the piston has been entirely eliminated so that the assembly and rebound spring force is based on a known and closely controlled load instead of a predetermined height connection.

The FIG. 3 embodiment is functionally the same as that of FIGS. 1 and 2 and has a piston assembly 84 with a cylindrical body 86 having a depending flange 88 the bottom of which is crimped at 89 to retain the hat shaped sheet metal main body 90 of a spring cage assembly 91 thereto. Stacked washers 92 may be installed between the upper flange 94 of the main body of the spring cage and the orifice plate 96 for a close fit. The intake valve disc 98 and wave spring 100 are the same in construction and function as corresponding elements of the embodiment of FIGS. 1 and 2 to control the flow through the intake passage 102.

The central passage 104 in the orifice plate 96 is controlled by the rebound valve assembly 106. This valve assembly comprises a blow off valve disc 108 urged into a blocking position by a helical spring 110 that has its lower end turn seated on an adjustable spring seat 112 that forms part of the spring cage assembly. The spring seat is similar to an eyelet and has a tubular shank 114 and an outwardly extending annular flange 116 that supports the rebound spring 110. The shank 114 slidably fits in a cylindrical neck 118 of the main body of the spring cage. A load cell 120 applies a preload 121 of a predetermined magnitude to the shank 114 to displace the spring seat and thereby compress the spring so that the spring 110 exerts a precise and predetermined spring force on the valve disc. After preloading the spring, the valve seat is fastened in adjusted position to the neck of the spring cage body by welds 122 to complete the spring cage assembly so that each rebound valve has the same operating characteristics. The downwardly projecting end of the the shank 114 can be severed at the lower limit of the neck of the cage so that each piston and rod assembly of a mass produced quantity has the same length dimension. The load is then removed and the piston rod 126 is joined to the piston assembly for subsequent assembly into a damper unit.

While a preferred embodiment has been shown and described, other embodiments will be apparent. Accordingly, the scope of the invention to cover the preferred and other embodiments of this invention is set forth in the following claims.

The embodiments of the invention in which an exclusive property or privilege is claimed are defined as follows:

1. A hydraulic damper unit for damping the spring action of vehicle suspension springs comprising:
    (a) a cylinder tube having a fluid therein,
    (b) piston means operatively mounted for linear stroking movement in said cylinder tube and hydraulically separating said cylinder tube into first and second variable volume fluid chambers,
    (c) fluid passage means in said piston means for operatively connecting said chambers so that fluid can flow between said chambers,
    (d) valve means associated with said piston means for controlling the flow from one of said chambers to the other, said valve means comprising a valve element and spring means associated with said valve element providing a spring force on said valve element to yieldably position said valve element into a blocking position with respect to said fluid passage means, and
    (e) cage menas for trapping said spring means to said piston means and compressing said spring means to a selected preload, said cage means comprising a main body, an adjustable seat for said spring means, means movably mounting said seat in said main body upon application of a load of predetermined magnitude thereto, from a preloading means and attaching means for securing said adjustable seat in fixed position with respect to said main body of said cage subsequent to preloading said spring means by the displacement of said seat.

2. A method of preloading flow control valving in a piston of a damper, comprising the steps of:
    (a) positioning a valve element adjacent an orifice plate of the piston,
    (b) positioning a spring onto the valve element,
    (c) positioning a cage means on the piston for compression of the spring, the cage means comprising:
        (i) a main body secured to the piston, and
        (ii) a seat element movable with respect to the main body and in communication with the spring,
    (d) applying a measured force from a preloading means to the seat element to selectively compress the spring, and
    (e) securing the seat element to the main body to maintain the selected compression of the spring.

3. A piston assembly for use in a damper, comprising:
    (a) body means;
    (b) fluid passage means provided in the body means;

(c) valve means for controlling fluid flow through the fluid passage means, the valve means including:
  (i) a valve element for blocking fluid;
  (ii) spring means for yieldably positioning the valve element;
(d) cage means secured to the body means for retaining the spring means against the valve element, the cage means including:
  (i) a main body,
  (ii) seat means, movable with respect to the main body, for selectively compressing the spring means, and
  (iii) attaching means for securing the seat means to the main body of the cage means to maintain a selected compression of the spring means.

4. The piston assembly as claimed in claim 3 wherein the seat means comprises a seat having a tubular shank portion and an annular flange portion.

5. The piston assembly as claimed in claim 4 wherein the main body of the cage means includes an opening for slidably receiving the tubular portion of the seat.

6. The piston assembly as claimed in claim 3 wherein the attaching means comprises at least one weld.

7. A piston assembly for use with a hydraulic damper comprising:
  (a) body means having an annular skirt;
  (b) fluid passage means provided in the body means;
  (c) valve means for controlling fluid through the fluid passage means, the valve means including:
    (i) a valve element for blocking fluid flow,
    (ii) selectively preloaded spring means for yieldably positioning the valve element,
  (d) retaining means including a cylindrical rim slidably received over and welded to the annular skirt after the spring means has been selectively compressed and preloaded against the valve element by the displacement of the rim.

8. A method of assembling fluid valving in a piston of a hydraulic damper so that the valving permits fluid flow in response to a predetermined pressure in the damper, the method comprising the steps of:
  (a) providing a preloading means;
  (b) inserting a valve element adjacent to one side of an orifice plate of the piston;
  (c) placing a first end of a spring onto the valve element;
  (d) placing a spring seat onto a second end of the spring;
  (e) axially displacing the spring seat by applying a load with the preloading means to selectively compress the spring; and
  (f) securing the spring seat in fixed relationship to the orifice plate to maintain the selected compression of the spring.

9. A piston assembly for use in a damper, comprising:
  (a) body means having a circumferential skirt at one end;
  (b) fluid passage ;means provided in the body means;
  (c) valve means for controlling fluid flow through the fluid passage means, the valve means including:
    (i) a valve element for blocking fluid flow, and
    (ii) spring means for yieldably positioning the valve element;
  (d) cage means including a complementary circumferential rim slidably received over and welded to the body means circumferential skirt after the spring means has been selectively compressed and preloaded against the valve element by the axial displacement of the rim.

* * * * *